(12) United States Patent
Thomas et al.

(10) Patent No.: US 6,602,460 B2
(45) Date of Patent: Aug. 5, 2003

(54) GAS INJECTED COMPRESSION MOLDING

(75) Inventors: Ronald Thomas, Chesterfield Township, MI (US); Nicholas Pitstick, Xenia, OH (US)

(73) Assignees: Alliance Systems, Inc., Chesterfield, MI (US); Composite Technologies, Inc., Dayton, OH (US)

( * ) Notice: Subject to any disclaimer, the term of this patent is extended or adjusted under 35 U.S.C. 154(b) by 20 days.

(21) Appl. No.: 09/821,900

(22) Filed: Mar. 30, 2001

(65) Prior Publication Data

US 2001/0038172 A1 Nov. 8, 2001

Related U.S. Application Data

(60) Provisional application No. 60/193,106, filed on Mar. 30, 2000.

(51) Int. Cl.⁷ .............................................. B29D 22/00
(52) U.S. Cl. ...................................................... 264/572
(58) Field of Search ........................................ 264/572

(56) References Cited

U.S. PATENT DOCUMENTS

| | | | |
|---|---|---|---|
| 5,108,672 A | | 4/1992 | Sasaki et al. |
| 5,344,596 A | | 9/1994 | Hendry .................. 264/40.3 |
| 5,534,216 A | * | 7/1996 | Kamiyama ................ 264/511 |
| 5,591,384 A | | 1/1997 | Abrams et al. ........... 264/40.5 |
| 5,637,329 A | | 6/1997 | Abrams et al. |
| 5,658,518 A | | 8/1997 | Ingram |
| 5,705,107 A | | 1/1998 | Kaneishi et al. |
| 5,718,855 A | | 2/1998 | Akahori et al. |
| 5,728,325 A | * | 3/1998 | Blankenburg ............ 264/28 |
| 5,728,410 A | | 3/1998 | Hendry |
| 5,741,455 A | | 4/1998 | Devanathan et al. |
| 5,780,076 A | | 7/1998 | Bauer et al. |
| 6,159,415 A | * | 12/2000 | Tanada ..................... 264/513 |

* cited by examiner

Primary Examiner—Suzanne E. McDowell
(74) Attorney, Agent, or Firm—Dinnin & Dunn, P.C.

(57) ABSTRACT

A method for the compression molding of a plastic article is provided. The method includes the steps of loading plastic material, that is preferably unheated, into a two piece molding chamber having at least one heating element, closing the molding chamber, and heating the plastic element. The method further includes the step of injecting fluid, for example air, into the plastic material to create at least one cavity within the plastic material. The air may be injected directly into the plastic material, or it may be injected along an upper surface of the chamber. Upon injection of air into the at least one cavity, a portion of the plastic material is forced to exit the chamber.

15 Claims, 1 Drawing Sheet

GAS INJECTED COMPRESSION MOLDING

Figure 1:
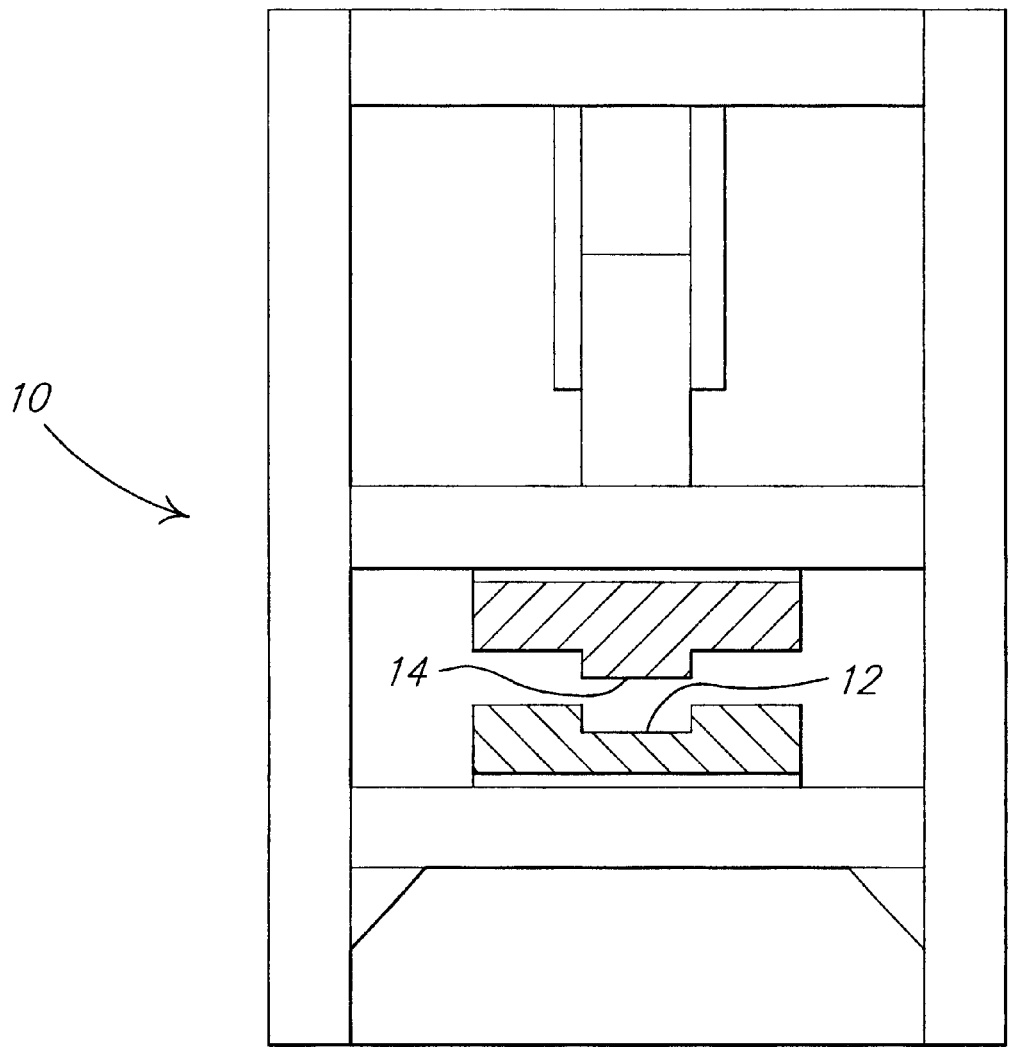

Continuation of Provisional Application Ser. No. 60/193, 106 Filed: Mar. 30. 2000

BACKGROUND OF THE INVENTION

The present invention relates to gas assisted compression molding of plastic parts. Various plastic molding systems such as injection molding and compression molding are known in the art. Generally, in injection molding, hot molten plastic resin is injected to flow into a closed and sealed mold. This process has been modified to inject gas into the mold to push the molten resin to completely and uniformly cover the surfaces of the mold. Compression molding begins with a solid charge of moldable material, which may be in the form of plastic or any polymeric compound which is introduced in solid form into the inner cavity of the lower portion of an open mold. The plastic charge is then heated and the mold is closed thereby compressing the plastic into the particular shape desired for the finished part. The compression caused by the mold closure forces the plastic throughout the mold and against the mold surface. No known attempt has been in the art to use gas to assist in this distribution of plastic in a compression molding application. Typically, to ensure complete fill out of the mold, enough plastic must be placed in the mold to completely fill the mold volume. In fact, compression molds are typically provided with overflow chambers at the extremities of the mold and excess plastic introduced to ensure that even the extremities are completely filled. However, even if the mold cavity is completely filled, the plastic material, which is either intentionally heated to facilitate its flow or increases in temperature due to the compression, will shrink upon cooling. This shrinkage or sagging causes the plastic to pull away from the top mold surface. Typically, the top mold surface is the "B" surface or "back" of the compression molded part and appearance is not critical.

As molding techniques have improved, tolerance for a less finished appearance for the "B" side has decreased. Further, although compression molding is more cost effective in many applications, it has been avoided because of a perceived inability to mold with uniformly finished sides. Still further, compression molding has often been deemed impractical for the production of certain parts because of difficulty in compressing the resin into certain shapes as the plastic does not flow as far or fluidly into narrow mold cavities as the more molten resin of injection molding. This condition is complicated or compound by the use of fillers in the plastic charge.

Since compression molding utilizes a prepared plastic charge or billet placed directly in the cavity, there has not been a perceived need for the molten plastic to be able to flow through relatively small orifices such as an injection molding sprue; and thus the plastic used may contain much less uniform materials than in other plastic molding materials. For example, compression molding plastic can contain fillers such as scrap plastic to reduce cost or elongated glass fibers to improve strength. Wherefore, there is a need in the art to increase the scope and efficacy of the compression molding process to allow use of such materials in a wider range of applications. One attempt to improve the speed and uniformity of the melting of the compression molded plastic in a mold is to heat the moldable material by introducing hot air into the then unsealed mold which is vented near the extremities before compression (U.S. Pat. No. 5,714,455).

DETAILED DESCRIPTION OF THE DRAWINGS

FIG. 1 is a diagrammatic view of a compression molding device according to the present invention.

DETAILED DESCRIPTION OF THE PREFERRED EMBODIMENT

The present invention is a new gas assisted process for compression molding plastic parts. First, a resin charge is received from an apparatus (such as that found in U.S. Pat. Nos. 5,637,329 and 5,591,384 which are hereby incorporated by reference) in the form of a billet. The billet is comprised of the molten material which is usually plastic along with other materials which may be included such as contaminated molded materials and/or long glass fibers or other long strand type material. The billet is then placed into an open mold. The mold is generally a vertical press 10 that has a primary mold surface 12 (the "A" surface) that is generally horizontal, i.e. the press operates in an up and down motion while the molded material is compressed out in a horizontal direction into the mold cavity. Once the billet is manually or automatically placed within the open mold the mold is closed which compresses the billet. During the compression of the billet, at a predetermined time within the compression stroke, gas is injected directly into the molded part at one or more locations. This will create a cavity within the part and the pressure of the gas will hold the plastic against the mold surfaces until the plastic cools. In this way, the billet or charge need not be of a volume to completely fill the mold cavity, and yet the mold surface will be completely covered. Further, as the gas is injected and forms the internal cavity, the gas forces the molten material to flow laterally along the mold surface. The gas may be any inert gas that will not cause combustion upon compression. The air may be heated to assist in the uniform melting of the plastic, or the air may be cooled to assist in the curing of the plastic and to decrease cycle time. Further, a suitable fluid could be injected instead of gas, particularly to assist in quickly cooling the plastic. There is at least one location for the gas injection, but more locations may be used depending on the hardening characteristics of the plastic resin being used and the shape of the part being molded.

The above process that uses gas injection into a compression molded part may be used to create parts produced from a thermoplastic resin or produce parts from a thermoset resin. Thermoplastic resin is capable of being reused, i.e. pop bottles and the like, while a thermoset resin can only be used once, and once set is no longer capable of being reset through recycling methods. Both the thermoplastic or the thermoset parts may be used in the process and can include a variety or combination of materials such as fillers, modifiers, reinforcing materials, post consumer recycled materials, etc. The gas assisted compression molding process also may be used in conjunction with the initial first pressure technique of directly injecting the gas at a brief first interval without diminishing the pressure of the gas at the gas source, and then injecting the gas into the compression molding apparatus at least one pressure less than the pressure of the gas in the gas source for a second longer interval. While this initial first pressure technique may be used, other known gas injection techniques may also be used in the gas assisted compression molding process. The gas may be injected into the compression mold via a gas injection pin nozzle, these nozzles are available in a variety of arrangements, such as a reciprocal pin extending into the cavity. The preferred nozzle allows for the injection and venting of gas into and from the interior of the molded parts.

The gas that is used in the gas assisted compression molding process may be applied using known gas volume control methods (injecting selected volumes of gas) or may be applied using the gas pressure control method (injecting gas at selected pressures for selected periods of time). In the pressure control method the gas is injected from a pressurized reservoir with the pressure preferably being held at a constant value at first. The pressure is then preferably reduced and held at that new value. The pressure may then be raised to a new value and held there if desired. One preferred injection profile then reduces and holds the pressure, and then the pressure is raised again for three consecutive periods until, finally, the pressure is reduced until the part is completely set. This "pounding" of the plastic against the mold surface with elevated air pressure is believed to be particularly effective due to the composition of plastic used in compression molding, particularly fiber reinforced or other non-homogeneous plastic compounds.

Another alternative that can be used in the gas assisted compression molding process is to have the gas injected from behind the molded part (between the upper mold surface the "B" surface 14 and the part) rather than into the molded part. This technique can be used when only one side of the molded part is to have a finished surface. If the back or inner surface is not critical then the gas can be injected into a sealed mold from a point in the upper mold surface thus, pushing the plastic towards the lower mold surface creating a better finished "A" surface of the part.

In another advantageous embodiment of the preferred invention, one or more overflow chambers are provided at the extremities of the mold cavity. The plastic charge is measured to nearly fill the mold cavity when melted, so that when air is injected into the part or along the "B" side, the molten resin will be forced along the mold surface to overflow into the overflow chambers. This assures that the mold surface is more thoroughly contacted by molten plastic, thereby creating a better molded surface.

While the above gas assisted compression molding process has been described in a variety of manners, it should be noted that other variations known in the art may also be applied to the disclosed gas assisted compression molding process.

What is claimed is:

1. A method for the compression molding of a plastic article comprising the steps of:
   loading unheated plastic material into a two piece molding chamber;
   closing said molding chamber; and
   injecting air into said plastic material and forcing a portion of said plastic material to exit said chamber.

2. A method for the compression molding of a plastic article comprising:
   loading unheated plastic material containing reinforcing fibers into a two piece molding chamber having at least one heating element;
   closing said molding chamber;
   heating said plastic material; and
   injecting air into said plastic material creating at least one cavity within said plastic material.

3. A method for the compression molding of a hollow plastic article comprising:
   loading plastic material into a two piece molding chamber having at least one heating element;
   closing said molding chamber;
   heating said plastic material;
   injecting air through a reciprocal pin into said plastic material creating at least one cavity within said plastic material.

4. A method for the compression molding of a plastic article comprising:
   loading unheated plastic material into a two piece molding chamber having at least one heating element;
   closing said molding chamber;
   heating said plastic material; and
   injecting fluid into said plastic material creating at least one cavity within said plastic material.

5. A method for the compression molding of a plastic article comprising:
   loading viscous heterogeneous plastic material into a two piece molding chamber having a pair of interior mold surfaces and having an open position and a closed position,
   closing said molding chamber compressing said plastic material to conform to said mold surfaces; and
   injecting air along said upper surface of said chamber while maintaining said molding chamber in said closed position.

6. A method for the compression molding of a plastic article comprising:
   loading unheated plastic material into a two piece molding chamber having at least one heating element, the volume of said plastic material being less than the volume of said molding chamber when closed;
   closing said molding chamber;
   heating said plastic material; and
   injecting air into said plastic material creating at least one cavity within said plastic material.

7. A method for the compression molding of a plastic article comprising the steps of:
   loading viscous plastic material into a two piece molding chamber having opposing interior mold surfaces;
   closing said molding chamber to compress said plastic material between said mold surfaces; and
   injecting air into said plastic material creating at least one cavity within said plastic material and forcing a portion of said plastic material to exit said chamber.

8. The method of claim 7 wherein said plastic material contains reinforcing fibers.

9. The method of claim 7 wherein the volume of said plastic material is less than the volume of said closed molding chamber.

10. A method for the compression molding of a hollow plastic article comprising:
    loading viscous plastic material into a two piece molding chamber having opposing interior mold surfaces;
    closing said molding chamber to compress said plastic material between said mold surfaces; and
    injecting air through a reciprocal pin into said plastic material creating at least one cavity within said plastic material.

11. The method of claim 10 wherein said plastic material contains reinforcing fibers.

12. The method of claim 10 wherein the volume of said plastic material is less than the volume of said closed molding chamber.

13. A method for the compression molding of a plastic article comprising:
    loading viscous heterogeneous plastic material into a two piece molding chamber having a pair of interior mold surfaces and having an open position and a closed position,
    closing said molding chamber compressing said plastic material to conform to said mold surfaces; and
    injecting fluid along said upper surface of said chamber while maintaining said molding chamber in said closed position.

14. The method of claim 13 wherein said plastic material contains reinforcing fibers.

15. The method of claim 13 wherein the volume of said plastic material is less than the volume of said closed molding chamber.

* * * * *